Feb. 14, 1928.

G. E. PURPLE 1,659,001

RETAINER CLIP FOR BELT FASTENERS

Filed March 31, 1927

Inventor
George E Purple
By
George I Haight
His Atty.

Patented Feb. 14, 1928.

1,659,001

UNITED STATES PATENT OFFICE.

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS.

RETAINER CLIP FOR BELT FASTENERS.

Application filed March 31, 1927. Serial No. 179,737.

This invention relates to improvements in retainer clips for belt fasteners.

Certain types of belt fasteners, particularly those for heavy duty such as conveyor belts, employ two plate-like members which are clamped to the opposite sides of the abutting belt ends by bolts and nuts, the bolts extending through the members and perforations in the belt ends. In applying said type of fasteners, the bolts must be held against falling out and also against rotation while the nuts are being turned down. To prevent turning of the bolts during the tightening of the nuts, the inside plate of said type of belt fasteners is commonly provided with lugs or shoulders which engage corresponding slots or shoulders on the bolt heads, one example of such a type of belt fastener being disclosed in my prior Patent 1,382,799 granted June 28, 1921.

Due to the fact that belt fasteners of the type indicated are generally used on relatively wide belts, it is difficult for one man to simultaneously properly hold the inner plate and bolt heads so as to prevent turning of the bolts while tightening the nuts and consequently it generally requires two men to apply the fasteners, one man on the inner or under side of the belt, holding the inner fastener plate and bolts in inter-locked engagement and the other man, on the outer or upper side of the belt, turning the nuts until the fastener is completely attached.

One object of my invention is to provide simple and inexpensive means usable with belt fasteners of the general type above indicated, for temporarily retaining the bolts and that plate of the fastener which have interlocking engagement in proper assembly while the nuts are being applied to the bolts on the opposite side of the belt in order that the application of the fastener may be made with less labor, more quickly and with assurance that the bolt heads will be properly seated when the application of the fastener is completed.

Another object of my invention is to provide means of the character indicated in the preceding paragraph which are further characterized by the fact that said means will be automatically disengaged from the fastener plate when the nuts on the bolts have been partially turned down to a point assuring sufficient friction between the parts of the fastener to thereafter prevent the bolt heads from becoming unseated while the nuts are being turned to their final position.

Other objects of the invention will more clearly appear from the description in connection with the accompanying drawing and claims hereinafter following.

Figure 1:
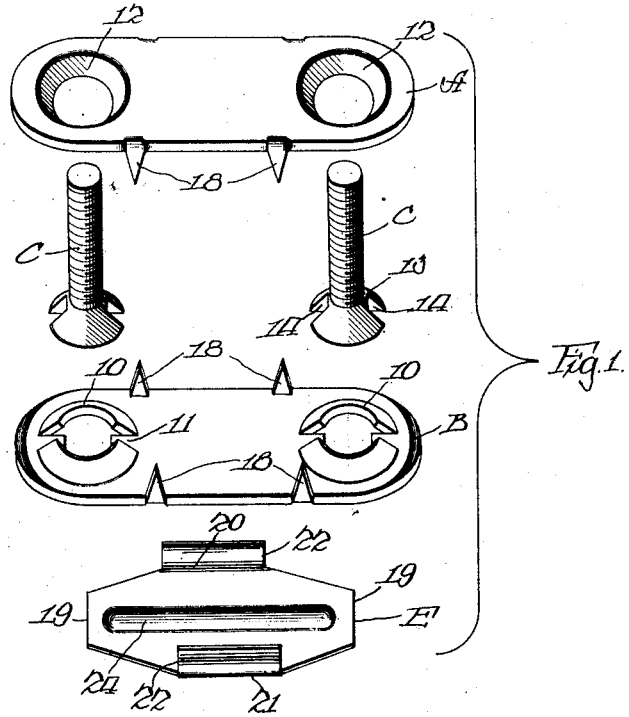
Figure 2:
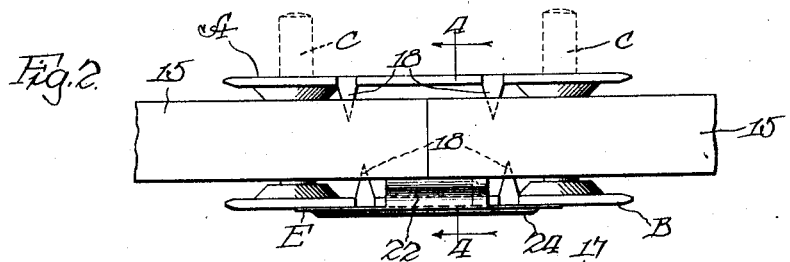
Figure 3:
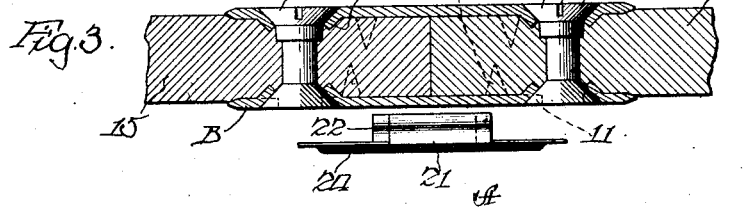
Figure 4:
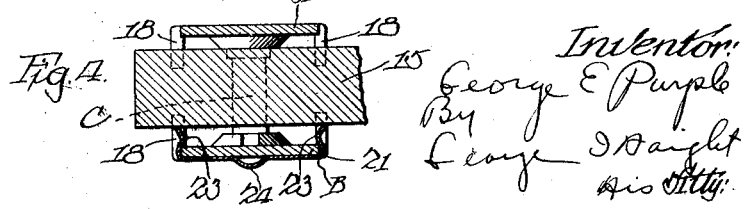

In the drawing, forming a part of this specification, Figure 1 is a view showing in perspective the several parts of a belt fastener and my improved retainer clip usable in connection therewith, the parts being separated and arranged in the general order in which they would be assembled. Figure 2 is a side elevational view of the abutting ends of a belt to be fastened together with the fastener and showing my improved retainer clip associated therewith, the condition of the parts being that when the fingers of the clip just engage the under-surface of the belt, and prior to the fastener being completely attached to the belt ends. Figure 3 is a sectional view, taken lengthwise of the belt and showing the fastener completely attached to the belt and with the retainer clip disengaged from the lower or inner plate of the fastener. And Figure 4 is a transverse sectional view, corresponding to the line 4—4 of Figure 2.

The belt fastener proper, shown in the drawing, which is illustrative of one type of fastener with which my retainer is adapted to be employed, comprises, broadly, an upper or outside plate A; a lower or inner plate B; and two bolts C—C, the nuts usable with the bolt C not being shown in Figure 1, but illustrated at D—D in Figure 3. The lower plate B, which will ordinarily be of relatively heavy gauge sheet metal is elongated and has counter-sinks at each end thereof defined by approximately semi-circular flanges 10—10, stamped out from the plate, the flanges 10—10 being separated by two diametrically disposed lugs 11—11 which are left in the main plane of the plate for the purpose hereinafter specified. The upper plate A is provided with registering counter-sinks 12—12, defined by flanges which, in the upper plate, are continuous as clearly shown in Figure 1. The bolts C are provided with conical heads 13—13, notched or recessed at diametrically opposite points as indicated at 14—14 so that, when the fastener is properly secured to the abutting ends 15—15 of the belt as shown in Figure 3, the heads 13 of the bolts will be seated in the counter-sinks of the inner plate B with the heads of the bolts flush with the plate and with the lugs 11 of the plate B engaged within the notches or recesses 14. The nuts 16 may be provided with screw driver slots 17 to permit the use of a suitable tool for rotating the same on the bolts. In fasteners of the type indicated, it is customary to provide prongs 18—18 on both plates so arranged as to enter the belt ends when the fastener is applied. Preferably four such prongs will be provided on each plate, two on each side, the two prongs on one side being longitudinally offset slightly with respect to the two prongs on the other side so as to prevent all of the prongs from being in alignment when a plurality of fasteners are used in attaching the belt ends. For a more detailed description of a belt fastener proper of the general type indicated, reference may be had to my said prior Patent No. 1,382,799.

In applying fasteners of the type indicated, it is essential that the bolt heads 13 be maintained in interlocked relation with the plate B so as to assure flush seating of the bolt heads and also to prevent turning of the bolts while the nuts are being screwed home. Heretofore, it has been customary to manually retain the bolt heads in this relation with the plate B while another operator turns the nuts on the opposite side of the belt. To obviate the manual procedure above indicated, I have provided the retainer clip indicated at E. This clip comprises a plate of somewhat elongated form and, as shown, with eight sides, the two end ones being indicated at 19—19 and the two central sides being indicated at 20 and 21, it being noted that the side edges 20 and 21 are slightly longitudinally offset for the purpose hereinafter described. Integrally formed with the plate E are two spring fingers 22—22, the same projecting from the side edges 20 and 21 and extending generally in a general right angular direction to the main plane of the clip plate. Said fingers 22, as clearly illustrated in Figure 4, are given permanent bends which provide inwardly projecting rounded shallow shoulders 23—23. The width of the fingers 22 is made appreciably greater than the thickness of the plate B so that the upper edges of the fingers 22 project somewhat above the plate B and to a somewhat greater extent than the depth of the counter-sinks provided by the flanges 10. The spacing between the fingers 22 is made to correspond with the width of the plate B and due to the fact that the material of which the clip is made, is inherently resilient, it is evident that the fingers 22 may be sprung over the plate B as clearly indicated in Figure 4 and temporarily held in assembled relation with the plate B by means of the shoulders 23. The length of the clip plate E is made such that the ends thereof will overlap the heads 13 of the bolts. The offsetting of the spring fingers 22 is made to accord with the offsetting of the prongs 18 and the length of the fingers 22 is made slightly less than the spacing between each pair of prongs, but of sufficient length so as to prevent the head of either bolt from being uncovered by the clip plate in any longitudinal position which the clip plate may assume, the limits of the longitudinal movement being determined by the spring fingers engaging with the prongs 18, as will be apparent from an inspection of Figure 2. The clip plate may be strengthened by providing an integrally formed longitudinal corrugation 24 therein, as shown in Figures 1 and 4.

In using my improvements, the two bolts C will be inserted through the plate B and the heads of the bolts properly seated. The clip E is then applied and will thereafter retain the bolts in proper assembled position with the plate B until the clip is disengaged as hereinafter explained. The assembly of the plate B, bolt C and clip E is then applied to the under or inner sides of the belt ends and the bolts inserted through suitable perforations previously made in the belt ends. The upper plate A is then applied over the shanks of the bolts and the nuts D then applied to the bolt shanks. The nuts D are turned down and as the two plates A and B are thereby brought closer together, the condition will arise as illustrated in Figure 2 where the prongs 18 are just beginning to enter the belt and the upper edges of the spring fingers 22 engage with the under-surfaces of the belt ends. At this time, it will be obvious that there is an appreciable tension on the bolts creating sufficient friction between the bolt heads and the plate B to thereafter prevent unseating of the bolt heads. As the nuts D are further turned down, the plates A and B will approach each other still more and automatically the clip plate E will be disengaged from the plate A at some point in the condition of the parts between those two conditions illustrated in Figure 2 and Figure 3. In actual practice, the shanks of the bolt C are generally made longer than necessary and, after the nuts D are turned down to their flush condition as illustrated in Figure 3, the excess length of the bolt shanks will either be cut off or twisted off so as to leave a flush condition at both the inner and outer sides of the belt.

With my improvements, it will be seen that the labor required in applying the fasteners is very materially reduced and assurance is had that the bolt heads will remain properly seated in the plate B during all the period of application of the fastener. It is obvious that the retainer clip plates may be made at very small expense and that one such retainer plate may be used in the application of a series of fasteners of the corresponding size, it being understood that the retainer plates will be made in different sizes to correspond with different sizes of belt fasteners.

Although I have herein shown and described what I now consider the preferred manner of carrying out my invention, the same is merely illustrative and I contemplate all changes and modifications that come within the scope of the claims appended hereto.

I claim:

1. As an article of manufacture, a temporary retainer clip for a belt fastener of the type employing plates and connecting elements extending from one plate to the other through the belt, said clip having means temporarily engageable with one plate to hold the clip and said plate assembled and having portions thereof arranged to be positioned over the ends of said elements to thereby hold the latter assembled with said plate.

2. As an article of manufacture, a retainer clip of the character described for a belt fastener of the type employing plates and connecting elements extending from one plate to the other through the belt, said clip having resilient fingers engageable with the edges of one plate and having end portions arranged to be positioned over the ends of said connecting elements whereby said clip is adapted to be held assembled with the plate and hold said elements assembled with the plate.

3. As an article of manufacture a retainer clip of the character indicated for a belt fastener of the type employing plates and connecting elements extending from one to the other through the belt, said clip having resilient fingers temporarily engageable with the edges of one of said plates and of greater width than the thickness of said plate whereby said fingers will engage the belt before said plate engages the belt to thereby force off the clip as the plate further approaches the belt, said clip being elongated with the ends thereof arranged to be positioned over the ends of said connecting elements.

4. In combination: a belt fastener plate having counter-sinks for the reception of a pair of bolt heads and provided with lugs engageable with the bolt heads to prevent turning of the latter; bolts having their heads seated in said counter-sinks and interlocked with said lugs; and a retaininer clip yieldingly engaged with said plate, said clip having the ends thereof extended over said bolt heads to hold the latter in their seats.

5. In combination: a belt fastener plate having counter-sinks at the ends thereof and provided with a pair of prongs along each side thereof, one pair being longitudinally offset with respect to the other pair, said plate having lugs at each counter-sink; bolts assembled with said plate, each bolt having a head seated in a counter-sink and recessed to receive the corresponding said lugs to prevent turning of the bolt; and a retainer clip of sheet metal having laterally separated spring fingers arranged to temporarily inter-lock with the edges of said plate, said fingers being elongated and disposed between the corresponding pairs of prongs and adapted to be limited in movement lengthwise of the fastener plate by said prongs, said clip having its ends extending over the heads of the bolts to thereby retain the latter in assembled relation with the fastener plate.

In witness that I claim the foregoing I have hereunto subscribed my name this 22nd day of March, 1927.

GEORGE E. PURPLE.